Patented May 23, 1944

2,349,243

UNITED STATES PATENT OFFICE 2,349,243

CATALYSIS

John R. Bates, Swarthmore, Pa., assignor to Houdry Process Corporation, Wilmington, Del., a corporation of Delaware No Drawing. Application March 4, 1942,
Serial No. 433,295

8 Claims. (Cl. 196—52)

The present invention relates to the art of catalytic treatment of hydrocarbons, and has particular application to the catalytic cracking of such materials.

The term "cracking" with respect to hydrocarbons has at present attained the significance in the art of the thermal or catalytic-thermal treatment of petroleum hydrocarbons at temperatures above about 750° F. While many and varied materials have heretofore been proposed as catalysts for cracking, the principal materials in commercial use are certain types of activated clays and certain synthetic silica-alumina co-precipitated gel composites.

It is an object of the present invention to provide improved processes of cracking hydrocarbons employing active cracking catalysts of a type not heretofore known. A further object is to provide processes of cracking hydrocarbons in which catalysts are employed which have activity for polymerization and alkylation reactions in addition to activity for the primary cracking reactions. Further objects and advantages will be apparent from the following description and the accompanying claims.

In accordance with a preferred form of the present invention a hydrocarbon material is catalytically treated at an elevated temperature by passing the hydrocarbon material at a temperature above 750° F. under conversion conditions in contact with a zirconium phosphate.

A principal application of this invention is in the cracking to gasoline of hydrocarbon materials higher boiling than gasoline. Following such a contacting operation, gasoline is separated from the synthetic crude. The gasoline so separated has been found to be exceptionally stable and to have a high octane value and a high blending value. Other applications of this invention involve the treating of gasoline under cracking conditions resulting in improvement of its stability and in improvement of its octane value; the reforming of naphthas resulting in increased octane value and in many instances in a lowering of the boiling range; and also the cracking of hydrocarbon gases.

The contact masses employed are in general produced by the interaction in aqueous menstruum of a compound of zirconium and a phosphate, including hydrogen phosphate, which is more commonly referred to as phosphoric acid. Most conveniently, the compound of zirconium is a soluble salt such as the nitrate, sulfate, chloride or oxychloride. Alternatively, however, the compound may be a dispersed hydrous oxide of zirconium or that which is assumed to be ammonium zirconium carbonate and which is prepared by the addition of ammonium or other alkali carbonate to a solution of a zirconium salt in quantity sufficient to dissolve the precipitate initially formed. The phosphate employed for economic reasons is preferably a metaphosphate, such as disodium phosphate, or other soluble metaphosphate. If desired, other phosphates may be employed. The zirconium phosphate as formed may be either a precipitate or a gel depending upon the specific materials employed and upon the concentration of the materials.

The zirconium phosphate may be washed free or substantially free of other cations and anions if desired, and it is dried either before or after washing. In accordance with a preferred form of this invention, zirconium phosphate so prepared is formed as pellets or other discrete pieces which are then calcined prior to use, though the initial cracking run may be employed for the purpose of calcination. By "calcination" it is intended to denote any heat treatment at a temperature above about 500° F.

Other methods of preparation may be employed, such as fusion processes, in which a phosphate and a zirconium salt are fused together, following which any suitable procedure is employed to produce an extended surface.

The contact material employed is herein referred to as zirconium phosphate primarily for convenience. It should, of course, be remembered that it has never been settled with respect to such oxygenated compounds whether they are combinations of a cation and an anion, or of a plurality of oxides. The materials here under consideration as precipitated do have the attribute of stoichiometric ratio, and therefore, appear not to be a mere physical mixture of oxides, and there are some indications that the insoluble material produced when a zirconium compound interacts with a phosphate may in fact be a zirconyl compound, and may be an acid phosphate. Further, there are some indications that during calcination of these zirconium phosphates prior to use the stoichiometric ratio is not preserved, and therefore, even if a compound when produced, dissociation appears to occur at least in part. The invention is not limited, however, by any theories of salt composition and structure as the products of interaction of the stated types of reagents appear to be substantially equivalent.

Within the scope of the present invention the zirconium phosphate may be deposited in any suitable manner on a desired support or carrier. The support may either be inactive, for example, silica gel, fuller's earth, bauxite, or bauxite which has been activated with respect to its decolorizing power, or it may be an active cracking material, for example, an activated montmorillonite clay or a silica alumina catalyst such as above referred to. It is, of course, to be expected that when an inert support is employed, the extent of cracking is decreased due to the diluent effect. It has been found, however, that such dilution does not decrease the extent of cracking in proportion to the amount of diluent present, but that cracking occurs to a considerably greater extent than would be anticipated.

The temperature upon contact of the hydrocarbon material with the zirconium phosphate is above 750° F. and in general it does not exceed 1000° F. The specific rates and pressures employed depend to a large extent upon the nature of the charging stock employed, and the extent of cracking desired. The rate employed will, however, be between 5/20 (5 volumes of charge liquid basis per 20 volumes of contact material per hour) and 100/20. Rates in the middle portion of this range, as for instance 10/20 to 50/20, are the most desirable for operations resulting in a substantial production of lower boiling material, as for instance the production of gasoline from higher boiling material. For cracking operations on naphthas of the commonly termed reforming type, higher rates as 40/20 to 100/20 are preferable. For cracking operations which involve the treating of cracked gasoline, rates in the lower portion of the range are preferable as for instance 5/20 to 30/20. The partial pressure of the hydrocarbon material upon contact likewise may vary considerably depending upon the charge and upon the extent of cracking desired.

Various specific embodiments of this invention are illustrated in the following examples.

*Example I*

A solution was prepared by mixing 42.5 kilograms of an acidic aqueous zirconium sulfate solution which contained 198.75 grams per liter of $ZrO_2$ and 332.17 grams per liter of $SO_4$ with 3.356 liters of 28% aqua ammonia and diluting with 20 kilograms of water. A second solution was prepared by mixing 5 liters of 28% aqua ammonia with 50 liters of aqueous phosphoric acid which contained 111 grams per liter of metaphosphoric acid. The two solutions were then mixed with vigorous stirring at normal room temperature. The precipitate was separated from the liquid by filtration, and the precipitate was dried in ovens at 200° to 210° F. The dried material was then washed till the wash water was free of phosphate and substantially free of sulfate, after which it was again dried in the same manner. This dry powder was then mixed with water at the rate of 0.44 liter of water per kilogram of powder and the mixture was formed as pellets in die plates. It is believed that the material at this point was dibasic zirconyl metaphosphate.

A portion of the material so prepared was heat-treated at 1050° F. for 2 hours in dry air. The pellets so treated were employed for the cracking of a gas oil with the production of gasoline. The gas oil was charged at the rate of 30/20 at atmospheric pressure and with the temperature in the contact mass 790° F. The synthetic crude so produced was fractionated and yielded 35% gasoline based on charge. The ratio of percent gasoline to percent coke was 6.73. Another portion of the pellets was heat-treated at 1400° F. for 10 hours in a 5% steam, 95% air mixture. When employed under the same conditions for cracking, 30% of gasoline was produced but the stated ratio was increased to 11.1, thereby considerably reducing the incident losses.

*Example II*

A solution was prepared by diluting 22.9 kilograms of the acidic aqueous zirconium sulfate, referred to in Example I, to 50 liters with water. A second 50 liter aqueous solution was prepared which contained 2.83 kilograms of metaphosphoric acid. These solutions were mixed at equal rates continuously with agitation in the mixing zone. The precipitate was filtered, dried, washed till the filtrate was free of phosphate and substantially free of sulfate and again dried. The dried powder was mixed with water at the rate of 2.73 kilograms per liter of water and the mixture then formed as pellets in a die plate.

The pellets so produced were heat-treated at 1400° F. for 10 hours in a 5% steam, 95% air mixture. When employed for cracking under the conditions stated in Example I, a high liquid recovery of 99.4% of the charge by volume was obtained, the yield of gasoline being 20.3% and the gasoline to coke ratio being 15.5.

*Example III*

A zirconium phosphate catalyst was prepared which was supported upon a silica gel as follows:

Four aqueous solutions were prepared, one containing 242 grams per liter of sodium silicate ("N" brand), a second 63.3 grams per liter of dibasic sodium phosphate dodecahydrate

$(Na_2HPO_4.12H_2O)$ the third an acidic zirconium sulfate solution as described in Example I, and the fourth 130 grams per liter of concentrated sulfuric acid. 725 parts of the silicate solution were mixed with 155 parts of the phosphate solution. 28.7 parts of the zirconia solution were mixed with 161 parts of the sulfuric acid. The two mixtures were then combined with agitation. The temperature was 82° F. and the pH was 3.48. The sol was allowed to stand till a firm, brittle gel had formed which was then dried for 4 hours at a temperature in the range of 120 to 160° F. and for 1½ hours at 200° F. The dry gel was then washed thoroughly with water, which was followed by washing with an ammonium chloride solution and further water washing. The washed gel was dried at 200° F., ground in a ball mill, mixed with 3% graphite, and formed in a pelleting machine of the pressure type. The pellets were heat-treated for 5 hours at about 1400° F. in a mixture of 6½% steam and 93½% air. After heat treatment the pellets had an apparent density of 0.936.

The catalyst so prepared was employed for the cracking of a gas oil under the conditions stated in Example I and yielded 16% gasoline with a gasoline to coke ratio of 17.6.

I claim as my invention:

1. In the catalytic production of valuable hydrocarbon materials, the process which comprises cracking a hydrocarbon material by subjecting it under reaction conditions to contact with a surface active contact body produced by the calcination of a zirconium phosphate.

2. In the catalytic production of valuable hydrocarbon materials, the process which comprises cracking a hydrocarbon material by subjecting it at a temperature above 750° F. to contact with a contact body produced by the calcination of a material resulting from the interaction of a soluble zirconium compound and a soluble phosphate.

3. In the catalytic treatment of hydrocarbon materials which comprises cracking a hydrocarbon by contacting it at a temperature of between 750° and 1000° F. and at a rate between 5/20 and 100/20 with a contact body comprising a zirconium phosphate produced by the calcination of a material produced by the interaction of a zirconium compound and a phosphate.

4. In the catalytic production of gasoline from hydrocarbons of average boiling range higher than gasoline which comprises cracking the higher boiling hydrocarbons in the presence of a zirconium phosphate, and separating a gasoline from the reaction products.

5. A catalyst active for the promotion of hydrocarbon cracking reactions, which catalyst comprises the product of calcination of a zirconium phosphate produced by the interaction of an aqueous solution of a zirconium compound and an aqueous solution of a phosphate.

6. A method of preparing catalysts for hydrocarbon cracking processes which comprises mixing a solution of a zirconium compound and a solution of a phosphate whereby an insoluble material is produced, drying the insoluble material, and calcining the dry material.

7. The process which comprises cracking a hydrocarbon material by contacting it under cracking conditions with a catalyst which comprises a zirconium phosphate produced by drying and calcining the reaction product from mixing a solution of a soluble zirconium salt and a solution of a soluble metaphosphate.

8. The process which comprises catalytically treating a hydrocarbon material at an elevated temperature above 750° F. under conversion conditions in contact with a zirconium phosphate.

JOHN R. BATES.